(12) United States Patent
Niesen

(10) Patent No.: US 7,079,682 B2
(45) Date of Patent: *Jul. 18, 2006

(54) TRUE COLOR INFRARED PHOTOGRAPHY AND VIDEO

(76) Inventor: Joseph W. Niesen, 15840 Shadywood Ct., La Mirada, CA (US) 90638

( * ) Notice: Subject to any disclaimer, the term of this patent is extended or adjusted under 35 U.S.C. 154(b) by 53 days.

This patent is subject to a terminal disclaimer.

(21) Appl. No.: 10/848,621

(22) Filed: May 18, 2004

(65) Prior Publication Data

US 2005/0013482 A1    Jan. 20, 2005

Related U.S. Application Data

(63) Continuation of application No. 09/708,149, filed on Nov. 7, 2000, now Pat. No. 6,792,136.

(51) Int. Cl.
*G06K 9/00* (2006.01)
(52) U.S. Cl. .................................................. 382/162
(58) Field of Classification Search ............... 382/162, 382/164–167, 170–171, 173, 181, 100, 103, 382/115, 118, 305, 282–284, 190–191, 156; 250/330, 316.1; 348/29–34, 43, 217, 152–153, 348/161, 164; 342/179; 359/618
See application file for complete search history.

(56) References Cited

U.S. PATENT DOCUMENTS

| 4,366,381 A | 12/1982 | Fischer et al. ............ 250/316.1 |
| 4,751,571 A * | 6/1988 | Lillquist ..................... 348/164 |
| 5,001,558 A | 3/1991 | Burley et al. ............... 348/164 |
| 5,497,430 A | 3/1996 | Sadovnik et al. ........... 382/156 |
| H1599 H | 10/1996 | Task et al. ................ 348/217.1 |
| 5,999,650 A | 12/1999 | Ligon ........................ 382/191 |
| 6,035,074 A | 3/2000 | Fujimoto et al. ........... 382/282 |

(Continued)

FOREIGN PATENT DOCUMENTS

EP    0598 454 A1 *  11/1993

OTHER PUBLICATIONS

Biehl et al., A Multilevel Multispectral Data Set Analysis in the Visiable and Infrared Wavelength Regions, IEEE vol. 62 No. 1 Jan. 1975, pp. 164-175.*

(Continued)

*Primary Examiner*—Joseph Mancuso
*Assistant Examiner*—Ishrat Sherali

(57) ABSTRACT

A method beginning at (10) is provided for creating high-fidelity visible coloring from infrared images of a scene under surveillance. The infrared images captured at (12) are analyzed at (14) to determine if an object, such as a face, is identifiable within the image. If an object is identifiable at (16) the object features are compared to a plurality of stored object features at (20). If there is a match at (22), the color characteristics of the object are obtained at (24) and the object is colored at (26) based on the stored database feature information. If there is no match at (22) or identifiable object at (16) and object color cannot be identified at (23), the image is analyzed at (28) to determine if a pattern, such as clothing, is identifiable within the image. If a pattern is identifiable at (30), the color characteristics of the pattern are obtained at (34) and the pattern is colored at (36) according to infrared reflectance characterization in conjunction with the stored pattern information. If no pattern is identifiable at (30), the non-pattern and non-feature containing portions of the image are colored at (38) according to infrared reflectance characterization.

10 Claims, 1 Drawing Sheet

U.S. PATENT DOCUMENTS

| | | | |
|---|---|---|---|
| 6,292,212 B1 * | 9/2001 | Zigadlo et al. | 348/33 |
| 6,292,575 B1 | 9/2001 | Bortolussi et al. | 382/118 |
| 6,301,050 B1 | 10/2001 | DeLeon | 359/618 |
| 6,417,797 B1 | 7/2002 | Cousins et al. | 342/179 |
| 6,476,391 B1 | 11/2002 | Zhang | 250/330 |
| 6,477,270 B1 * | 11/2002 | Wu | 382/167 |
| 6,496,594 B1 | 12/2002 | Prokoski | 382/118 |
| 6,920,236 B1 * | 7/2005 | Prokoski | 382/115 |
| 2002/0015536 A1 | 2/2002 | Warren et al. | 382/284 |

OTHER PUBLICATIONS

Wilder et al., Comparison of Visible and Infra-Red Imagery for Face Recognition, IEEE 0-8186-7713-9/96, 182-186.*
John Hartung, et al. "Object-Oriented H.263 Compatible Video Coding Platform for Conferencing Applications", Jan. 1998, IEEE Journal, vol. 16, No. 1.
Brian Dipert, "C'mon, baby, do theAnimotion", Dec. 23, 1999, pp. 59-665.
Brochure, "FaceIt"—Advanced Vision for Face Recognition, Visionics Corporation.
Frances Zelazny, "Visionics FaceIt is First Face Recognition Software to be used in a CCTV Control Room Application", Visionics Corporation.
Frances Zelazny, "Visionics Corporation and Symbol Technologies Enable New Class of 2D Bar Code Applications", Visionics Corporation.
Polaroid, "Polaroid and Visionics Deliver Real-Time On-Line Face Recognition to DMV Systems", Press Release.
Frances Zelazny, "Visionics to Unveil Third Generation FaceIt Engine" Visionics Corporation website.
"Artificial Retina—A Conceptual Overview", Mitsubishi Electronic Device Group.
U.S. Patent & Trademark Office, Patent 5,983,147 "Video Occupant detection and classification"; Nov. 9, 1999 (website http://164.195.100.11).
Shaogang Gong, "Face Recognition in Dynamic", website www.dcs.qmw.ac.uk, Fri. Jul. 11, 1997.
Qing Jiang, "Principal Component Analysis and Neural Network Based Face Recognition", Nov. 30, 1998, website www.cs.uchicago.edu.
Daniel P. Huttenlocher, et al., "Object Recognition Using Supspace Methods", Proc. of the European Conference on Computer Vision, pp. 536-545, 1996.
"Image Segmentation", Image Segmentation by Automatic Contour Tracing, printed Sep. 25, 1999, website www.pixeldata.com.
J. Cai, et al., "Detecting Human Faces in Color Images", 1998, website www.cs.wright.edu.
"False Color of Jupiter's Great Red Spot", printed May 22, 1999, website www.jpl.nasa.gov.
Chris Chovit, "ATREM ATmosphere REMoval Program" Earth Remote Sensing Group, Jun. 2, 1997, website http://cires.colorado.edu.
"Imaging Spectroscopy: Concept, Approach, Calibration, Atmospheric Compensation, Research and Applications" printed May 22, 1999, website http://makalu.jpl.nasa.gov.
Ed Scott, "Spectral Sensitivity of the Infrared Color Film" C1997 website http://euro.webtravel.org.
"Infrared Photography", printed May 22, 1999, website www.police.ucr.edu.
"Color Infrared Photography", printed May 22, 1999, website www.aabysgallery.com.
Gavin Wrigley, "The Spearmint Guide to Infrared Photography", printed May 22, 1999, webiste www.netlink.co.uk.
J. Wilder, P.J. Phillips, C. Jiang, S. Wiener, Comparison of Visible and Infra-Red Imagery for Face Recognition, IEEE 1996 Proceedings of the Second International Conference, pp. 182-187.
A. Pentland, B. Moghaddam, T. Starner, "View-Based and Modular Eigenspaces for Face Recognition", Proceedings of the IEEE Computer Society Conference on Computer Vision and Pattern Recognition, Jun. 21-23, 1994 p. 84-91.
S. Gutta, J. Huang, V. Kakkad, H. Wechsler, "Face Surveillance", Sixth International Conference on Computer Vision, Jan. 4-7, 1998, p. 646-651.
Abstract of L. Gottesfeld Brown, "A Survey of Image Registration Techniques", ACM Computing Surveys, Dec. 1992, vol. 24, iss 4, p. 325-376.
Abstract of J.P. Strong, III, Azriel Rosenfeld, "A Region Coloring Technique for Scene Analysis", Communications of the ACM, Apr. 1973, vol. 16, iss 4, p. 237-246.

* cited by examiner

TRUE COLOR INFRARED PHOTOGRAPHY AND VIDEO

This application is a continuation of U.S. patent application Ser. No. 09/708,149 filed on Nov. 7, 2000 now U.S. Pat. No. 6,792,135.

BACKGROUND OF THE INVENTION

1. Technical Field

The present invention generally relates to photographic and video imaging techniques and, more particularly, to a method of producing true color infrared photographic and video images.

2. Discussion

Photographic and video equipment are widely used by law enforcement personnel for surveillance purposes. During the daytime, or under similar bright-light conditions, such photographic and video surveillance is used not only to track subjects, but also for subject identification purposes. This is possible due to the clarity of the image produced by the photographic and/or video equipment.

Surveillance during nighttime or other low-light conditions is more challenging. Due to the low level of ambient light, conventional visible photographic and video imaging is impossible. Such equipment is simply not sensitive enough to capture images during such low light conditions. Recently, however, a new nighttime surveillance technique has been employed by law enforcement officials with success.

To track subjects under low light conditions, law enforcement personnel are now widely employing infrared sensitive equipment. Infrared imaging is based on sensing thermal radiation from a scene and imaging involves recording the heat patterns from the scene. While such infrared sensitive equipment has enabled law enforcement personnel to track subjects during low light conditions, it has not been very useful for subject identification purposes. That is, the image produced by the infrared sensitive equipment is not detailed enough to permit recognition of the facial features of a subject under surveillance. As such, positive identification of a subject is still not possible.

A prior art technique for attempting to overcome the limitations of prior art infrared surveillance techniques is known as false color imaging. Images captured during false color imaging are created from a wider range spectrum than the human visual system can sense. The resulting image is remapped into the visual spectrum to create a pseudo-colored image.

Unfortunately, false color imaging equipment is highly sensitive to blue radiation. This requires the use of a yellow filter to filter out the blue radiation. Such yellow filters distort the color in the image finally produced. Further, the illumination wavelength used for creating red images in such false color imaging equipment is extended into the near infrared spectrum. As such, non-red items that have a high infrared reflectance, such as leaves, are reproduced as red images. Due to these drawbacks, false color imaging has not had great acceptance or success when applied to subjects for identification purposes. Other applications include stealthy surveillance, MPEG4 object segmentation algorithms, lighting options for the film recording and camcorder industries, and the medical industry.

In view of the foregoing, it would be desirable to provide a technique for producing images during low-light conditions which enables not only tracking of a subject but also sufficient detail to enable subject recognition and identification.

SUMMARY OF THE INVENTION

The above and other objects are provided by a method for creating a true color representation of an infrared image. The methodology begins by capturing an infrared image of a scene under surveillance. The captured image of the same scene taken from different infrared spectral bands are then analyzed to determine if an object, such as a face, is identifiable within the image. If an object is identifiable within the image, the methodology compares the object characteristics with a plurality of stored object images. If a match is made, the methodology looks up characteristics of the object in a database and colors the object according to the database information. If no match is made and the true color cannot be identified, or if no object is identifiable within the image, the methodology determines whether a pattern, such as clothing, is identifiable within the image. If a pattern is identifiable within the image, the methodology looks up information regarding the characteristics of the pattern in the database. The pattern is then colored using infrared reflectance characterization from multispectral imaging as guided by the database pattern information. The non-pattern/non-object containing portions of the image are colored using infrared reflectance characterization from multispectral imaging. Though images are measured in the infrared, the multispectral characterization database allows true visible color images to be produced from infrared images. As such, a true color image is produced enabling subject recognition and identification.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
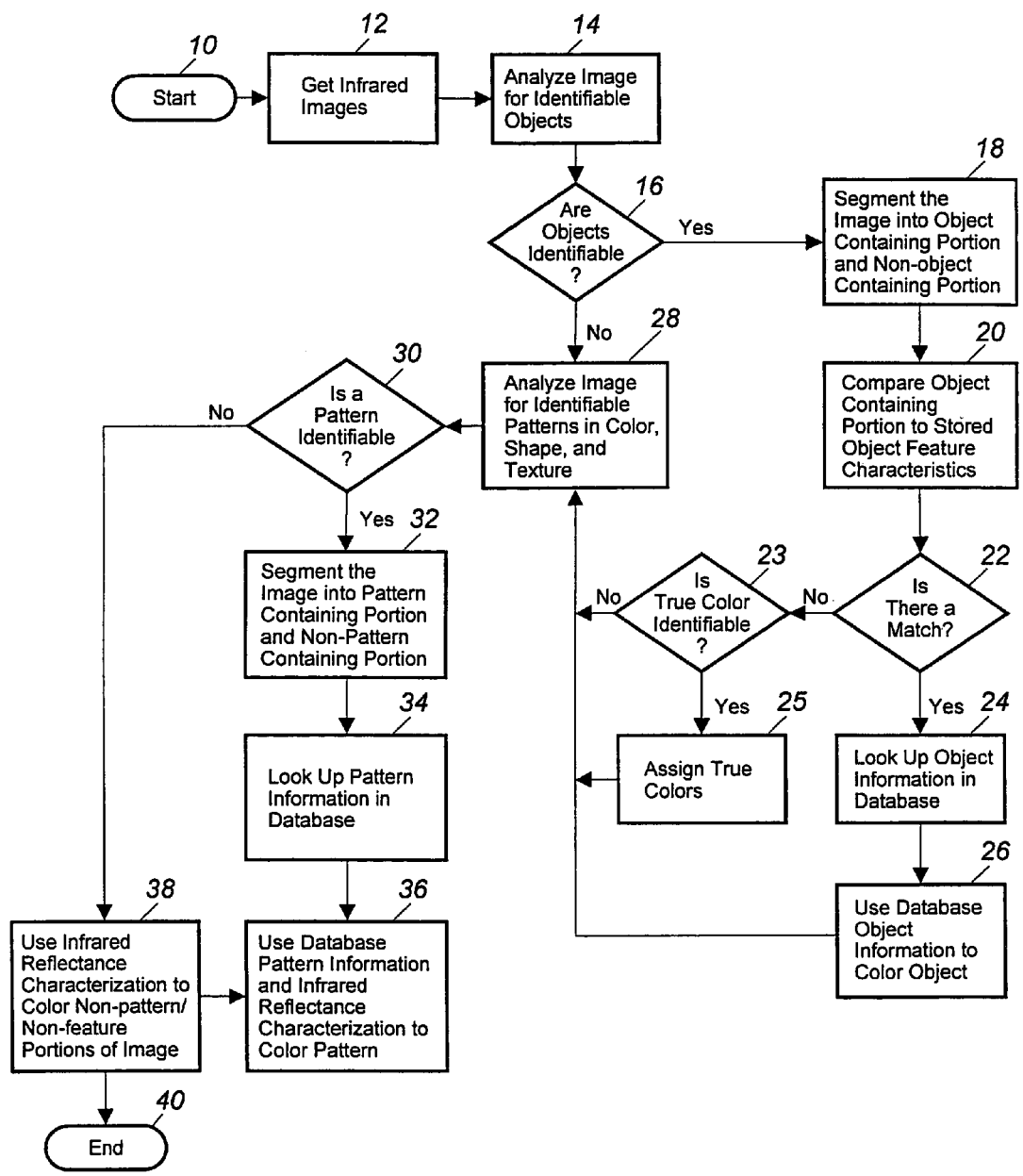
FIG. 1 is a flowchart illustrating the methodology of the present invention.

The present invention is directed towards a method of creating a true color representation of an infrared image. The methodology employs pattern and object recognition software with hyperspectral imaging techniques to color the infrared image. The method is advantageous in that the detailed image can be used to identify a subject under surveillance in low-light conditions.

Turning now to the drawings figures, FIG. 1 illustrates a preferred embodiment of the present invention. The methodology starts in bubble 10 and continues to block 12. In block 12, the methodology obtains infrared images taken from different infrared spectral bands for a scene under surveillance. In a law enforcement application, such a scene would include an individual or subject under surveillance. The infrared image is preferably captured using active, controlled infrared illumination on a commercial CMOS camera chip. To capture the image, it is presently preferred to sequentially illuminate the scene with different wavelengths on a frame by frame basis. Alternatively, three cameras can be employed, each operating at a different wavelength, to illuminate the scene. From block 12, the methodology continues to block 14.

In block 14, the methodology analyzes one of the infrared images for identifiable objects. Such an object may include, for example, a face of a subject captured in the image. Commercial off the shelf software is preferably employed for performing object recognition on the infrared image. For example, Lucent has developed software for conferencing applications, Visionics has software for face recognition, Mitsubishi for artificial retina, and Expert Vision for computer animation. Other manufacturers/developers offering suitable software include AT&T, Texas Instruments, Samsung, NEC, and OKI. After completing the analysis at block 14, the methodology continues to decision block 16.

In decision block 16, the methodology determines whether an object is identifiable in the image. If an object is identifiable based on characterizing features including infrared spectral characterization, the methodology continues to block 18. In block 18, the methodology segments the image into an object containing portion and a non-object containing portion. From block 18, the methodology continues to block 20.

In block 20, the methodology compares the object containing portion of the image with a plurality of objects who have characterized features stored in a database. After comparing the object feature characteristics in the image to the stored object feature characteristics in block 20, the methodology continues to decision block 22. In decision block 22, the methodology determines if the identified object in the image matches a set of object features characterized and stored in the database. If a match is made, the methodology advances to block 24.

If no match is made, the methodology advances to decision block 23. In decision block 23, the methodology determines whether true color can be identified in the object containing portion of the image. If true color is identifiable in the object containing portion of the image, the methodology advances to block 25. In block 25, the object is assigned its true colors. From block 25, or if no true color is identifiable in the object containing portion of the image in decision block 23, the methodology advances to block 28.

In block 24, the methodology obtains detailed information regarding the characteristics of the object features identified in the image from the database. Such information may include, for example, an individual's skin tone, skin color, eye color, eye separation, hair color, nature of any facial scarring, and other facial characteristics. Color characteristics in the visible are derived from multispectral infrared analysis. From block 24, the methodology continues to block 26.

In block 26, the methodology reconstructs and colors the object features of the image using the stored feature information from the database as a guide. This technique yields an extremely accurate, true color image since the identified features are colored according to a matching image stored in a database. True color assignment allows the illumination conditions to be determined in a localized area around the identified object. Known illumination conditions allow more accurate color assignment in the area near the identified object. After coloring the object containing portion of the image in block 26, the methodology continues to block 28. Also, referring again to decision block 22, if the identified object in the image does not match any of the object feature characteristics stored in the database, the methodology advances to block 28. Similarly, if no object is identifiable in the image at decision block 16, the methodology advances to block 28. If infrared characterization strongly indicates a preferred but not guaranteed object identification, that image portion can be segmented for further analysis or it can be tracked in time sequence photography/video until the object is identified. Color tracking is an effective object tracking characteristic.

In block 28, the methodology analyzes the image for identifiable patterns. Commercial off the shelf software such as those identified above is preferably employed for performing pattern recognition processing on the image. Although not limiting, such a pattern could include the clothing on the individual within the image, leaves or surrounding trees, grass or bushes, painted signs and objects, or buildings. Such a pattern will also include the face of any subject in the scene. In this way, an object identified at decision block 16 but not matching a stored object feature characteristic at decision block 22 is reacquired as a pattern.

After completing the analysis at block 28, the methodology continues to decision block 30. In decision block 30, the methodology determines whether a pattern is identifiable in the image. If a pattern is identifiable, the methodology continues to block 32. In block 32, the methodology segments the infrared image into a pattern containing portion and a non-pattern containing portion. After segmenting the image in block 32, the methodology continues to block 34.

In block 34, the methodology obtains detailed information regarding the characteristics of the pattern identified in the image from a database. Such pattern information may include, for example, details regarding the color and hues of clothing, painted metal objects, trees, buildings, or other objects in the image. The pattern information may also include skin color and tone based on eye separation, hair color based on hair features like curls, or other facial characteristics. From block 34, the methodology continues to block 36.

In block 36, the methodology reconstructs and colors the pattern containing portion of the image using infrared reflectance characterization in conjunction with the pattern information from the database. Preferably, multispectral imaging is employed for this purpose. In multispectral imaging, the spectrum of every substance in the image is identified and colored accordingly. That is, for each spatial resolution element in the image, a spectrum of the energy arriving at a sensor is measured. These spectra are used to derive information based on the signature of the energy expressed in the spectrum. Since different substances absorb and reflect energy in different regions of the spectrum, all substances within the image can be identified and colored. The pattern information is used to guide the selection of colors in the infrared reflectance characterization process based on known characteristics of the identified patterns/objects. For example, objects of known color from the database are colored according to the database information despite a multispectral imaging conclusion to the contrary. Multispectral imaging is only used when there is a certain relation between measure infrared data and the projected visible spectrum components.

After coloring the pattern containing portions of the image at block 36, the methodology continues to block 38. Also, referring again to decision block 30, if no pattern is identifiable within the image, the methodology advances to block 38. In block 38, the methodology colors the non-pattern/non-object containing portions of the image using infrared reflectance characterization techniques. Preferably, multispectral imaging is employed for this purpose. After coloring the non-pattern/non-object portions of the image at block 38, the methodology continues to bubble 40 where it exits the subroutine pending a subsequent execution thereof.

Thus, the present invention combines ongoing efforts in infrared surveillance, image pattern recognition, and multispectral imaging to produce a true color image. Unique to this system are the use of active, controlled illumination and multispectral imaging characterization that maps to true color representation in the picture or video. Ambient infrared illumination can be used in place of the active infrared illumination if desired. In facial recognition from images or a video, feature extraction from the face is employed. According to the methodology, positive identification of an individual in darkness using active infrared illumination triggers a lookup in a database of that person's skin tone, color and other characteristics. The database features are then used to reconstruct a color image of the person. In pattern recognition from images or video, multispectral imaging recognizes different objects in the image. After the software identifies the face region, general characterization of infrared reflectance of different skin colors is used to determine what the true color of the skin is based on the measured infrared reflectance characteristics. After the software identifies clothing, for example, general characterization of infrared reflectance of different clothes is used to determine what the true color of the clothes is based on the measured infrared reflectance characteristics. Painted metal objects, trees, buildings, and other environmental surroundings are similarly identified and characterized to produce true color.

Advantageously, the present invention allows surveillance systems to view, unknown to the subject under surveillance, the true visible color of the subject. This aids in identification and tracking of the subject. The system either assigns color to the subject based on positive identification from face recognition and lookup of skin color in a database, or true color is determined from blind acquisition, using multispectral imaging and pattern recognition for object identification and multispectral imaging for infrared reflectance measurements to assign true visible color to the object, or true color is assigned to the object solely by multispectral imaging for infrared reflectance measurements. Law enforcement personnel, the entertainment industry, and automotive, aircraft, and defense manufacturers will likely find this invention particularly useful.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of producing a true color image comprising the steps of:
   obtaining an infrared image of a scene over different spectral bands;
   determining if an object within said image is identifiable;
   segmenting said image into an object containing portion and a non-object containing portion if said object is identifiable;
   comparing said object containing portion to a plurality of stored object feature characteristics;
   coloring said object containing portion of said image according to information from said stored object feature characteristics if said object matches a set of said stored object feature characteristics;
   determining if a pattern within said image is identifiable;
   segmenting said image into a pattern containing portion and a non-pattern containing portion if said pattern is identifiable;
   coloring said pattern containing portion of said image using multispectral imaging in conjunction with stored pattern information; and
   coloring said non-object and non-pattern containing portions of said image by applying multispectral imaging to said image.

2. The method of claim 1 further comprising determining whether true color is identifiable in said object containing portion of said image if said object does not match any set of said stored object feature characteristics.

3. The method of claim 2 further comprising assigning true colors to said object if said true color is identifiable in said object containing portion of said image.

4. The method of claim 1 wherein said step of coloring said object containing portion of said image further comprises obtaining said information regarding said object features characteristics from a database.

5. The method of claim 1 wherein said step of coloring said pattern containing portion of said image further comprises obtaining said pattern information from a database.

6. A method of producing a true color image comprising the steps of:
   obtaining an infrared image of a scene over different spectral bands;
   determining if an object within said image is identifiable;
   segmenting said image into an object containing portion and a non-object containing portion when said object is identifiable;
   comparing said object containing portion to a plurality of stored object characteristics;
   coloring said object containing portion of said image according to color information for a given stored object characteristic when said object matches the given stored object characteristic;
   determining if a pattern within said non-object containing portion is identifiable;
   segmenting said non-object containing portion of the image into a pattern containing portion and a non-pattern containing portion when said pattern is identifiable;
   coloring said pattern containing portion of said image using multispectral imaging in conjunction with stored pattern information; and
   coloring said non-pattern containing portions of said image using multispectral imaging.

7. The method of claim 6 further comprising determining whether true color is identifiable in said object containing portion of said image when said object does not match any of said stored object characteristics.

8. The method of claim 7 further comprising assigning true colors to said object when said true color is identifiable in said object containing portion of said image.

9. The method of claim 6 wherein coloring said pattern containing portion of said image further comprises:
   coloring said pattern containing portion of said image using multispectral imaging;

comparing said pattern to a plurality of stored patterns, each pattern being associated with pattern color information; and coloring said pattern containing portion of said image according to pattern color information for a given stored pattern when said pattern matches the given stored pattern.

10. A method of producing a true color image comprising the steps of:

obtaining an infrared image of a scene over different spectral bands;

determining if a pattern within said image is identifiable;

segmenting said image into a pattern containing portion and a non-pattern containing portion when said pattern is identifiable;

coloring said pattern containing portion of said image using multispectral imaging;

comparing said pattern to a plurality of stored patterns, each pattern being associated with pattern color information;

coloring said pattern containing portion of said image according to pattern color information for a given stored pattern when said pattern matches the given stored pattern; and coloring said non-pattern containing portions of said image using multispectral imaging.

* * * * *